(12) United States Patent
Staudenmaier et al.

(10) Patent No.: US 10,986,309 B2
(45) Date of Patent: Apr. 20, 2021

(54) VIDEO BUFFERING AND FRAME RATE DOUBLING DEVICE AND METHOD

(71) Applicant: FREESCALE SEMICONDUCTOR, INC., Austin, TX (US)

(72) Inventors: Michael Andreas Staudenmaier, Munich (DE); Vincent Aubineau, Areches (FR); Ioseph E. Martinez-Pelayo, Austin, TX (US)

(73) Assignee: NXP USA, Inc., Austin, TX (US)

( * ) Notice: Subject to any disclaimer, the term of this patent is extended or adjusted under 35 U.S.C. 154(b) by 644 days.

(21) Appl. No.: 14/953,724

(22) Filed: Nov. 30, 2015

(65) Prior Publication Data

US 2017/0006257 A1    Jan. 5, 2017

(51) Int. Cl.
*H04N 7/01* (2006.01)
*H04N 5/04* (2006.01)

(52) U.S. Cl.
CPC ............. *H04N 7/0127* (2013.01); *H04N 5/04* (2013.01); *H04N 7/0105* (2013.01); *H04N 7/0132* (2013.01)

(58) Field of Classification Search
CPC .................................................. H04N 7/0127
USPC .......................................................... 348/441
See application file for complete search history.

(56) References Cited

U.S. PATENT DOCUMENTS

| 5,299,007 | A | | 3/1994 | Saeger et al. | |
|---|---|---|---|---|---|
| 5,754,234 | A | * | 5/1998 | Kitsuki | G06T 9/007 348/394.1 |
| 6,522,363 | B1 | | 2/2003 | Deiss et al. | |
| 8,797,457 | B2 | | 8/2014 | Stevens | |
| 8,830,403 | B1 | * | 9/2014 | Kametani | H04N 7/013 348/441 |
| 2003/0072754 | A1 | | 4/2003 | Kenyon et al. | |
| 2003/0079106 | A1 | | 4/2003 | Tasuda | |
| 2005/0231637 | A1 | | 10/2005 | Jeffrey | |
| 2009/0046990 | A1 | * | 2/2009 | Takemura | B60R 1/00 386/222 |
| 2011/0050862 | A1 | * | 3/2011 | Cheng | H04N 13/139 348/51 |

(Continued)

FOREIGN PATENT DOCUMENTS

| EP | 0805430 A1 | 11/1997 |
|---|---|---|
| EP | 2202715 A2 | 6/2010 |
| JP | 2013034039 A | 2/2013 |

OTHER PUBLICATIONS

Video Frame Rate Double Up-Conversion, Contact person: Dmitriy S. Vatolin (dmitriy@graphics.cs.msu.ru) MSU Graphics & Media Lab (Video Group), http://graphics.cs.msu.ru/en/node/947.
Report on low latency video capture and display, Paul Bourke, Sep. 2, 2012, http://paulbourke.net/papers/latencyreport.pdf.
Non-Final Office Action dated Nov. 15, 2016 for U.S. Appl. No. 14/708,947, 21 pages.

(Continued)

*Primary Examiner* — Jefferey F Harold
*Assistant Examiner* — Justin B Sanders

(57) ABSTRACT

A frame buffer having a size of one video frame of a video stream is provided. The video stream has a source frame rate. Image data units of the video stream are written consecutively to the frame buffer in accordance with a circular buffering scheme and in real-time response to the video stream. Image data units are read from the frame buffer in accordance with the circular buffering scheme with a frame rate that is twice the source frame rate so as to generate a target video stream having a frame rate which is twice the source frame rate. The frame buffer can be used in a real-time video system, for example in a vehicle.

20 Claims, 7 Drawing Sheets

(56) References Cited

U.S. PATENT DOCUMENTS

| | | | | |
|---|---|---|---|---|
| 2012/0307049 | A1* | 12/2012 | Mimar | G08B 13/19676 348/143 |
| 2013/0093583 | A1 | 4/2013 | Shapiro | |
| 2013/0215333 | A1 | 8/2013 | Kurokawa et al. | |
| 2013/0229497 | A1* | 9/2013 | Delacoux | H04N 13/296 348/47 |
| 2015/0117776 | A1* | 4/2015 | Mizuno | G09G 5/04 382/167 |
| 2015/0312504 | A1* | 10/2015 | Aldridge | H04N 5/3743 348/157 |
| 2016/0173847 | A1* | 6/2016 | Staudenmaier | H04N 5/77 |
| 2016/0191795 | A1* | 6/2016 | Han | G06T 3/4038 348/36 |

OTHER PUBLICATIONS

Gefource, "Adaptive Vsync", downloaded from <<http://geforce.com/hardware/technology/adaptive-vsync/technology>> on Jan. 10, 2014; 2 pages.

U.S. Appl. No. 14/708,947, Inventor Michael Andreas Staudenmaier, "Video Processing Unit And Method Of Buffering A Source Video Stream", filed May 11, 2015, Office Action—Final Rejection, dated Apr. 13, 2017.

Notice of Allowance, U.S. Appl. No. 14/708,947 dated Jul. 30, 2018 9 pages.

Office action, Final Rejection, U.S. Appl. No. 14/708,947 dated May 7, 2018 26 pages.

Office action, Non-Final Rejection, U.S. Appl. No. 14/708,947 dated Dec. 28, 2017 25 pages.

* cited by examiner

VIDEO BUFFERING AND FRAME RATE DOUBLING DEVICE AND METHOD

CROSS REFERENCE TO RELATED APPLICATION(S)

The present application claims priority to International Patent Application No. PCT/IB2015/001340, entitled "VIDEO BUFFERING AND FRAME RATE DOUBLING DEVICE AND METHOD," filed on Jun. 30, 2015, the entirety of which is herein incorporated by reference.

FIELD OF THE INVENTION

This invention relates to a video buffering and frame rate doubling device, a vehicle, and a method.

BACKGROUND OF THE INVENTION

A video frame is a still image that can be displayed on a video display, e.g., a liquid crystal display (LCD) or a cathode ray tube (CRT). A video stream is a stream of video frames. Consecutively displaying the video frames on a screen can give a viewer the impression of a moving image. The number of frames per second provided by the video stream and the number of frames per second displayed by the display are each known as a frame rate. The stream of video frames can be provided in the form of a stream of image data units, each frame comprising a certain number of consecutive image data units. Each image data unit may represent, for example, a single pixel or a group of pixels, e.g., a group of adjacent pixels.

In a real-time viewing system, a video camera can be operated to generate a video stream which can be fed to a video display to provide a live view of the scene captured by the video camera. Traditionally, a buffer connected between the video source and the video display can ensure a steady display of the video content.

Some types of video sources, e.g., cameras, and some types of video displays, e.g., LCDs, have a certain fixed frame rate which is tunable only within a very narrow range. For instance, certain cameras are designed to produce video streams with a frame rate of 30 frames per second (fps), and some video displays have a refresh rate of 60 Hertz (Hz), i.e. 60 fps.

It is an object of the invention to provide a buffering and a frame rate doubling device for driving a video display by a video stream having a frame rate which is half the frame rate of the video display. Furthermore, it is an object of the invention to provide a method of driving a video display by a video stream having a frame rate which is half the frame rate of the video display. It is desired to implement the device and to execute the method using low cost hardware.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals identify identical, equivalent, or similar components.

DETAILED DESCRIPTION OF THE PREFERRED EMBODIMENTS

In a first aspect of the invention, a video buffering and frame rate doubling device is presented. The device includes a video input, a memory unit, a buffer control unit, and a display control unit. In operation, the video input receives a source video stream. The memory unit provides a frame buffer having a size of one frame of the source video stream. The buffer control unit writes a sequence of image data units of the source video stream consecutively to the frame buffer in accordance with a circular buffering scheme. The display control unit reads the image data units from the frame buffer in accordance with the circular buffering scheme with a frame rate that is twice the source frame rate to generate a target video stream having a frame rate which is twice the source frame rate.

In a second aspect of the invention, a method of buffering a video stream is presented. The method includes receiving a source video stream and writing image data units of the source video stream consecutively to a frame buffer in accordance with the circular buffering scheme, wherein the frame buffer has a size of one video frame of the source video stream. The method further includes reading image data units from the frame buffer in accordance with the circular buffering scheme with a frame rate that is twice the frame rate of the source video stream.

The device and the method are based on the insight that each video frame written to the frame buffer can be read and re-read precisely once during one source frame period. This is surprising because for most of the time, the frame buffer will contain part of one frame and part of the next frame. Therefore, reading the frame buffer with frequencies other than the source frame rate will generally mix successive frames giving rise to visual artefacts. As will become clear from the description below, mixing of successive frames can be avoided when the buffer readout frequency is twice the source frame rate.

Figure 1:
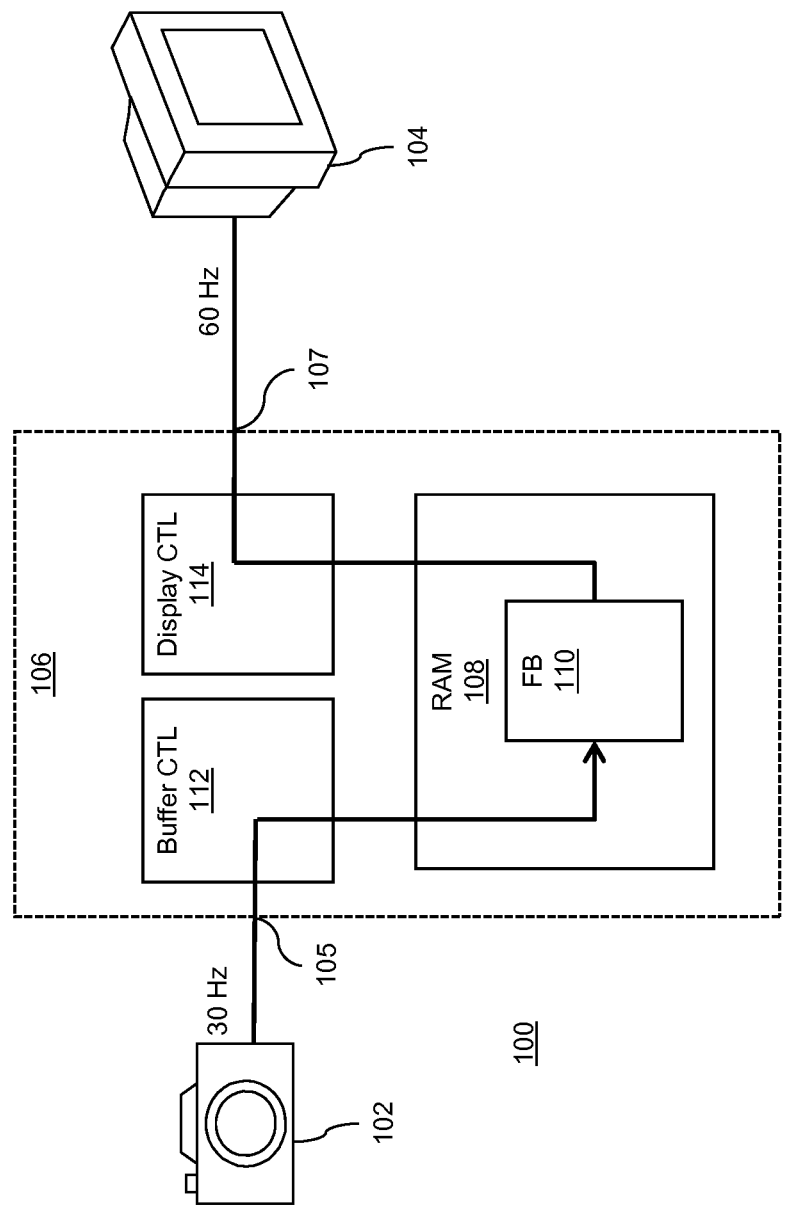
FIG. 1 schematically shows an example of an embodiment of a video system.

FIG. 1 schematically shows an example of a video system 100 in which embodiments of the present invention (described in greater detail with reference to FIGS. 2 to 7) can be implemented. The video system 100 includes a video source 102, a video buffering and frame rate doubling device 106 (buffering unit) and a video display 104. The video source 102 may, for example, be a video camera, e.g., a surveillance camera. The video source 102 and the video display 104 use a first frame rate (e.g., approximately 30 Hz) and a second frame rate (e.g., approximately 60 Hz), respectively, wherein the second frame rate is roughly twice the first frame rate. The frame rate of the video display 104 may be tunable within a relatively narrow range with respect to its nominal frame rate of, e.g., 60 Hz, for example, by adjusting a vertical synchronization gap (vsync gap) or a horizontal synchronization gap (hsync gap), or both.

The buffering unit 106 includes a video input 105, a memory unit 108, a buffer control unit 112, and a display control unit 114. The video input 105 can be connected to the video source 102 so as to receive a video stream (source video stream) from the video source 102. The frame rate (e.g., 30 Hz) of the source video stream is called the source frame rate. The source video stream includes a stream of video frames provided in the form of a stream of image data units, e.g., pixels or groups of adjacent pixels. The memory unit 108 is arranged to provide a frame buffer 110 with a size of one video frame of the source video stream. The frame buffer 110 may be a dedicated hardware component or it may be a memory region located in a memory device such as a random access memory (RAM). The buffer control unit 112 is connected to or integrated in the memory unit 108 and arranged to write the image data units of the source video stream consecutively to the frame buffer 110 in accordance with a circular buffering scheme, preferably in real-time response to the source video stream. A circular buffering scheme is a scheme in which consecutive data units, e.g., image data units, are written to consecutive memory cells, e.g., registers, of a buffer until a last memory cell (buffer element) of the buffer has been reached. The next data unit will then again be written to the first buffer element. The same applies similarly to read accesses to the buffer. In other words, a circular buffering scheme is a buffering scheme in which write accesses and read accesses are performed in write cycles and in read-out cycles, respectively, each cycle starting with an access to the first buffer element and completing with an access to the last buffer element. A circular buffer is a buffer which is operated in accordance with a circular buffering scheme.

The display control unit 114 is connected to the memory unit 108 and arranged to read image data units from the frame buffer 110 in accordance with the circular buffering scheme with a read-out frequency (e.g., 60 fps) which is twice the source frame rate (e.g., 30 fps). The display control unit 114 thus generates a video stream (target video stream) having a target frame rate that is the double of the source frame rate. In some embodiments, this is performed by the display control unit reading each source video frame from the frame buffer twice in two successive read-out cycles. Each source frame is thereby doubled, resulting in a target video stream that includes a stream of double frames. As will become clearer from the more detailed description below, the copies of the source video frames generated by the proposed scheme can be identical or nearly identical replica of the source video frames. The video output 107 can be connected to the video display 104 so as to provide the target video stream to the video display.

Figure 2:
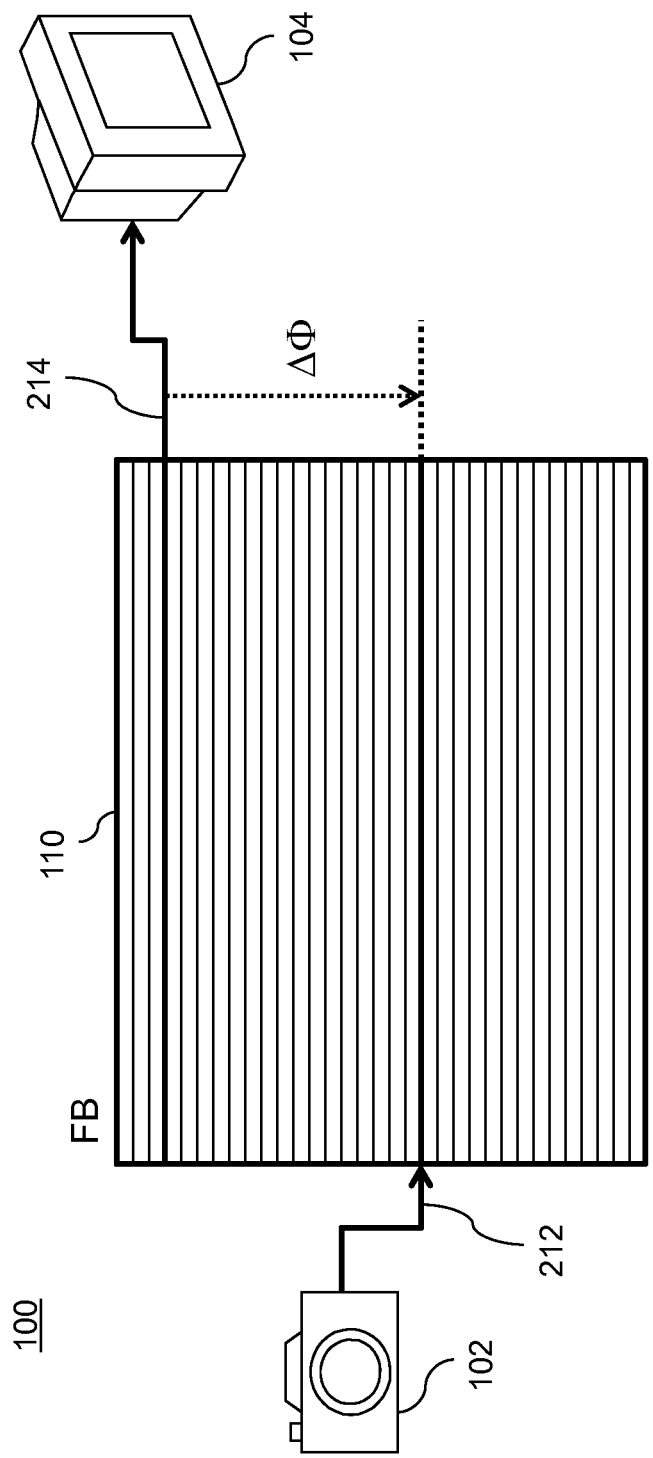
FIG. 2 schematically shows an example of an embodiment of a frame buffer.

Operation of the buffer control unit 112 and the display control unit 114 is further illustrated schematically in FIG. 2 by way of an example. In the example, the buffer control unit (not shown in FIG. 2) writes image data units from the video source 102 in real time response to the source video stream successively to the frame buffer 110, starting at a first buffer element (the top row of the frame buffer 110 in the figure) and moving successively through the frame buffer 110 until the last buffer element (the bottom row of the frame buffer 110 in the figure) is reached. The write cycles can be synchronized with the source video stream, e.g., by means of vsync symbols of the source video stream, so that at the end of the write cycle, one entire video frame from the video source 102 occupies the frame buffer 110. With each new write cycle, the content of the frame buffer 110 is overwritten with a new source frame. The content of the frame buffer 110 can thus be updated cyclically, e.g., periodically, with new video frames from the video source 102.

At the same time, the display control unit 114 (not shown in FIG. 2) reads out the frame buffer 110 in a cyclic manner, by accessing the buffer elements (the rows in the figure) one after the other and starting again at the first buffer element after reading out the last buffer element. The display control unit can be operated with a read-out frequency which is twice the source frame rate. The read-out frequency is the number of frames retrieved from the buffer per second. Accordingly, a phase shift MD between read accesses by the buffer control unit and write accesses by the display control unit can vary cyclically between 0 and 2·π or 360° during one write cycle. In other words, a write pointer 212 indicating the buffer element of a current write access by the buffer control unit 112 moves through the frame buffer once per frame of the source video stream while a read pointer 214 indicating the buffer element of a current read access by the display control unit 212 moves through the frame buffer 110 twice per source frame, thus generating two target frames. The read pointer 214 is thus synchronized, at least approximately, with a fictitious write pointer that has a speed or frequency which is twice the speed or frequency of the actual write pointer 212. The display control unit 114 can be clocked independently from the source video stream. For example, the video source 102 and the buffering unit 106 can each include its own clock. This can be particularly convenient when the video source 102 and the buffering unit 106 are implemented as separate devices, e.g., as two devices that are connectable with each other via a connecting cable or a wireless link, e.g., using a communication protocol such as ZIGBEE. In this case, sufficiently accurate synchronization of the write accesses and the read-accesses can be achieved, for example, by means of feedback control, as will be described further below.

Figure 3:
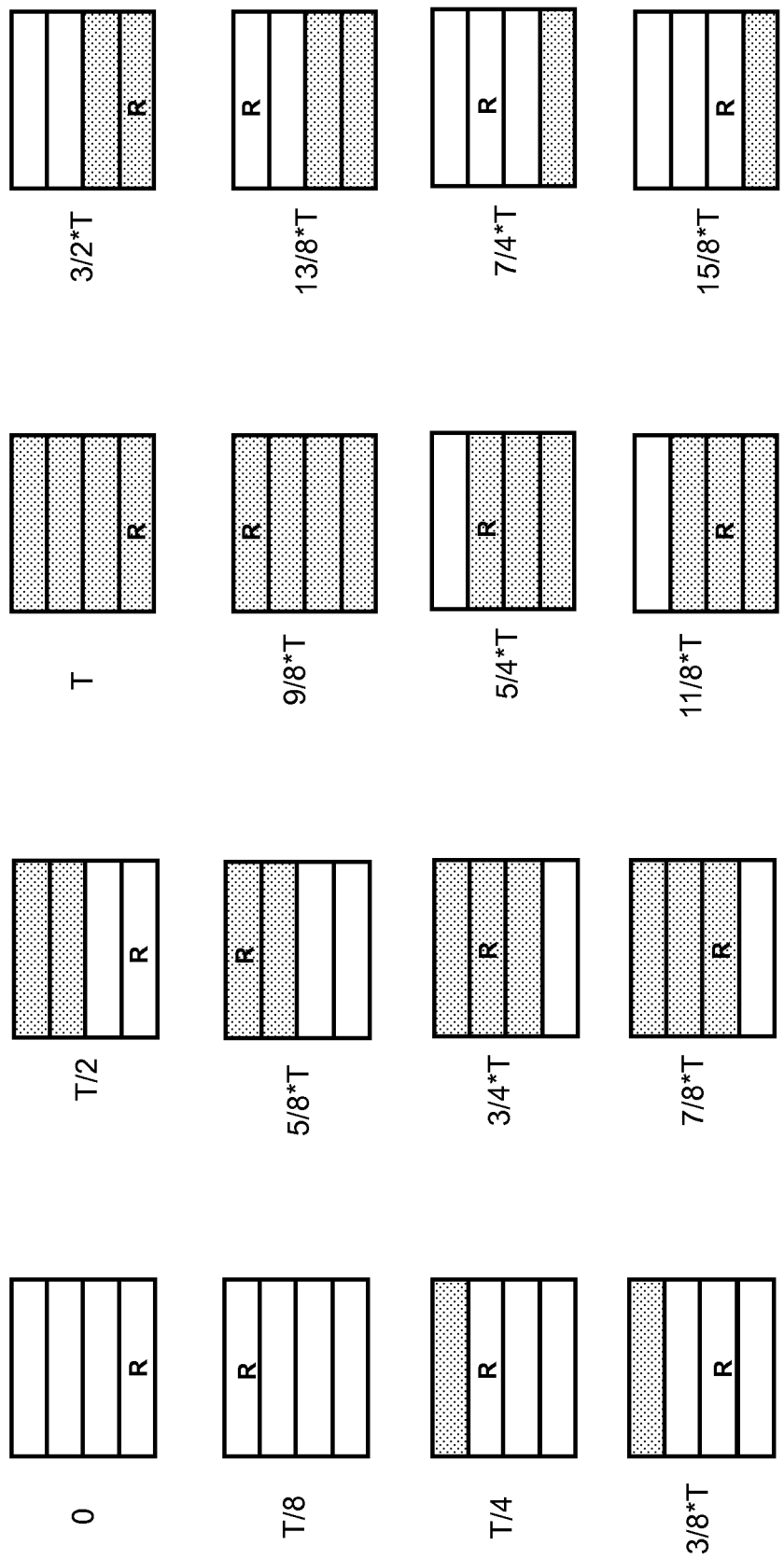
FIG. 3 schematically illustrates an example of an embodiment of a method of buffering a video stream including frequency doubling.

An example of a mode of operating the frame buffer 110 is further illustrated schematically in FIG. 3. The figure schematically represents the content of the frame buffer 110 at successive times, namely at times k*T/8 where k=0, 1, 2, . . . , 15 and where T is the frame period of the source video stream. For example, when the source video stream has a frame rate of 30 Hz, T=1/30 seconds. The frame buffer 110 is shown as having four buffer elements (represented by the four rows in each of the sixteen rectangles in the figure). For times 0 to T, blank rows represent image data of a first source frame (first frame). Shaded rows represent image data of the next source frame (second frame). For times T to 15/8*T, blank rows represent image data of a third source frame (third frame) succeeding the second frame.

At time 0, the frame buffer contains the first frame. As shown, the first frame (blank rows) is successively replaced by image data of the second frame (shaded areas). The character "R" indicates the position of the read pointer 214 from FIG. 2 at each of the shown instants. In the example, the display control unit first re-reads the first frame (blank rows), which it already read in the preceding read-out cycle. At time T/2 it starts reading the second frame (shaded rows). At time T, it starts re-reading the second frame. At time 2*T (not shown), it will start reading the third frame (blank rows). While it takes a time of approximately T/4 for the write pointer to proceed from one buffer element to the next, it takes a time of only approximately T/8 for the read pointer to proceed from one buffer element to the next. The proposed scheme is, of course, not limited to a frame buffer comprising four buffer elements, but can readily be adapted to any desired number of buffer elements.

Figure 4:
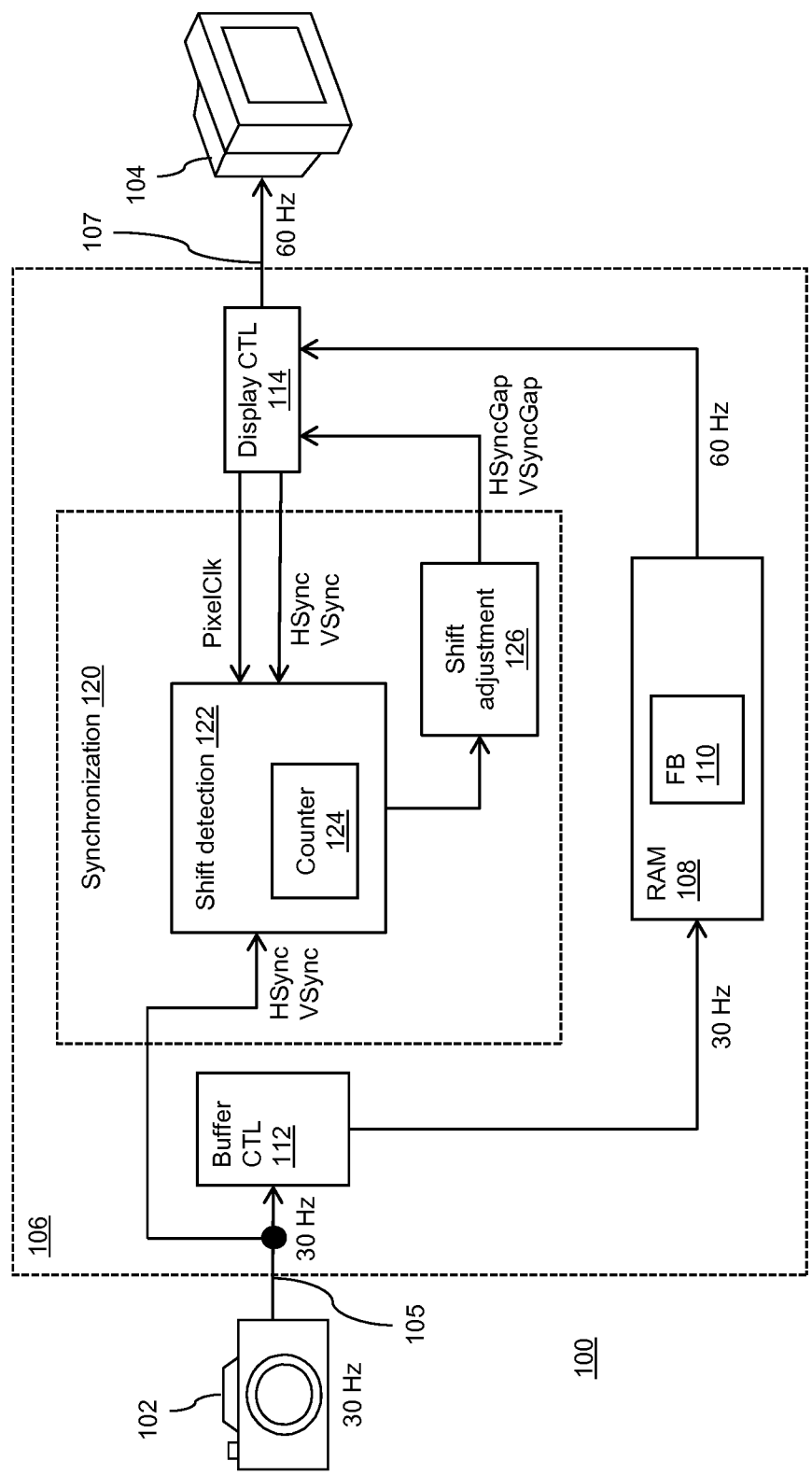
FIG. 4 schematically shows an example of an embodiment of a video buffering and frame rate doubling device.

Referring now to FIG. 4, the buffering unit 106 may include a synchronization unit 120 having an input connected to the video input 105 and an output connected to the display control unit 114. The synchronization unit 120 can be arranged to adapt a timing of read accesses to the frame buffer by the display control unit 114 to the timing of the source video stream. This timing results in translation of each video frame of the source video stream into a double frame (i.e. into a pair of identical or nearly identical successive video frames of the target video stream). The read accesses can, for example, be timed as described above with reference to FIG. 3. When they are perfectly timed, i.e. when the display control unit starts re-reading a first source video frame in the frame buffer 110 just before that frame is being overwritten by the buffer control unit 112, each source frame translates into two successive target frames which are perfect replica of the respective source frame. Otherwise, i.e. in the case of imperfect synchronization, each video frame of the source video stream may translate into two successive target frames which may exhibit content of the previous or the next source frame in a small initial or final part of the respective target frame. In many applications, such minor differences between source frames and corresponding target frames can be tolerated, considering that successive source frames will in many cases be identical or nearly identical, e.g., when a video camera captures a stationary or slowly changing scene. In other applications, such effects (cut-off effects) can be unacceptable, and the synchronization then needs to be accurate. In the example of FIG. 4, the buffering unit 106 includes a feedback scheme that is capable of ensuring accurate timing of the read-accesses, as will be described below.

The display control unit 114 may be arranged to generate a sequence of vsync symbols and vsync gaps and a sequence of hsync symbols and hsync gaps as part of the target video stream, e.g., in the form of signals synchronized with or included in the stream of target frames. The display control unit can thus be adapted to drive standard video displays using vertical and horizontal synchronization. A vertical synchronization (vsync) symbol is a certain value or level of a vsync signal, and it indicates a frame break, i.e. the end of one video frame and the beginning of a next video frame. A horizontal synchronization (hsync) symbol is a certain value or level of an hsync signal, and it indicates a line break, i.e. the end of one frame line and the beginning of a next frame line within a video frame. A vsync signal can be provided, for example, in the form of a controlled voltage (vsync voltage). A vsync symbol can be represented, for example, by a high level of the vsync voltage. Similarly, an hsync signal can be provided in the form of a controlled voltage (hsync voltage) and an hsync symbol can be represented by, e.g., a high level of the hsync voltage. Synchronization signals, hsync as well as vsync, can be implemented in various manners, e.g., using coded representations on a single channel instead of separate bi-level signals. Each vsync symbol may be followed by a vsync gap and each hsync symbol may be followed by an hsync gap. A vsync gap is a pause after or overlapping with a vsync symbol. An hsync gap is a pause after or overlapping with an hsync symbol. Increasing the hsync gap and/or the vsync gap increases the frame period and reduces the frame rate.

The synchronization unit 120 can be arranged to adjust the length of the vsync gaps or the length of the hsync gaps of the target video stream, or length of both, on the basis of the source video stream. The timing of read accesses to the frame buffer by the display control unit 112 can thereby be adapted to the timing of the source video stream. For example, the synchronization unit can be arranged to adjust the length of the vsync gaps or the length of the hsync gaps of the target video stream such that the read pointer 214 (see FIG. 2) of the display control unit 114 overtakes the write pointer 212 (see again FIG. 2) when the buffer control unit 112 has written a complete source frame to the frame buffer 110 and before it starts writing the next source frame to the frame buffer 110.

For example, the synchronization unit 120 may be arranged to adapt the timing of read accesses so as to synchronize every second vsync symbol of the target video stream with a corresponding vsync symbol of the source video stream. The synchronization unit can thus ensure that every vsync symbol of the source video stream essentially coincides with a corresponding vsync symbol of the target video stream, thus enabling the display control unit 114 to re-read the current video frame residing in the frame buffer before that frame is overwritten by the buffer control unit 112.

For example, the synchronization unit 120 may include a feedback loop arranged to determine a vsync delay, which is a delay between a vsync symbol of the source video stream and a vsync symbol of the target video stream. The feedback loop can thus adjust the length of the vsync gaps or the lengths the hsync gaps of the target video stream, or both, on the basis of the vsync delay. In other words, read accesses of the display control unit to the frame buffer can be timed using vsync-based feedback control. Preferably, the feedback loop is further arranged to determine an hsync delay, which is a delay between an hsync symbol of the source video stream and an hsync symbol of the target video stream, and to adjust the lengths of the vsync gaps or the lengths of the hsync gaps, or both, of the target video stream on the basis of both the vsync delay and the hsync delay. In this manner, a tight loop control can be implemented, thus locking the target video stream tightly to the source video stream.

Instead or in addition to feedback control based on vsync delays, the synchronization unit 120 can be arranged to detect vsync symbols of the source video stream, and the display control unit can be arranged to start a new read-out cycle in response to detection of a vsync symbol of the source video stream. Each vsync symbol of the source video stream can thus trigger two successive read-out cycles. In other words, the display control unit can be arranged to perform two successive read-out cycles in response to the synchronization unit detecting a vsync symbol in the source video stream. As explained above with reference to FIG. 3, the two successive read-out cycles can comprise a first read-out cycle (e.g., from time 0 to time T/2) followed by a second read-out cycle (e.g., from time T/2 to time T). The first read-out cycle can include re-reading a video frame from the frame buffer that was read in the preceding read-out cycle. The second read-out cycle can include reading a new video frame from the frame buffer.

Timing the read accesses to the frame buffer by means of feedback control can be particularly convenient when the video source and the display control unit are clocked independently from one another. For instance, the video source can be connected to a first clock (not shown) so as to be clocked by the first clock while the display control unit is connected to a second clock (not shown) so as to be clocked by the second clock. The first clock and the second clock can be operated independently, adequate timing of the read accesses being ensured by the synchronization unit 120.

Still referring to FIG. 4, the synchronization unit 120 may include a shift detection unit 122 and a phase adjustment unit 126. The shift detection unit 122 can have a first input connected to the video input 105 and a second input connected to the display control unit 114. The shift detection unit 122 can be arranged to determine one or more of a current hsync delay and a current vsync delay, e.g., on the basis of hsync symbols or vsync symbols from the video input 105 and hsync and vsync symbols from the display control unit 114. The phase adjustment unit 126 has an input connected to the shift detection unit 122 and an output connected to the display control unit 114. The phase adjustment unit 126 can be arranged to compute the value of a hsync gap and the value of a vsync gap on the basis of, e.g., a signal indicative of a delay of hsync symbols and/or vsync symbols from the display control unit 114 relative to hsync and/or vsync symbols from the video input 105. The phase adjustment unit 126 can thus enable the display control unit 114 to adjust its hsync gap and its vsync gap so that its read accesses to the frame buffer 110 are appropriately timed relative to write accesses to the frame buffer 110 by the buffer control unit 112.

The shift detection unit 122 may, for example, include a counter 124 for counting the time from a vsync symbol received at the video input 105 to a next vsync symbol from the display control unit 114. This measured time can provide a measure of the vsync delay.

The shift detection unit 122 may similarly include a counter 124 for measuring an hsync delay (not shown). The counter 124, and similarly, if present, the counter (not shown) for the hsync delay can be clocked, for example, by means of a pixel clock signal from the display control unit 114.

Figure 5:
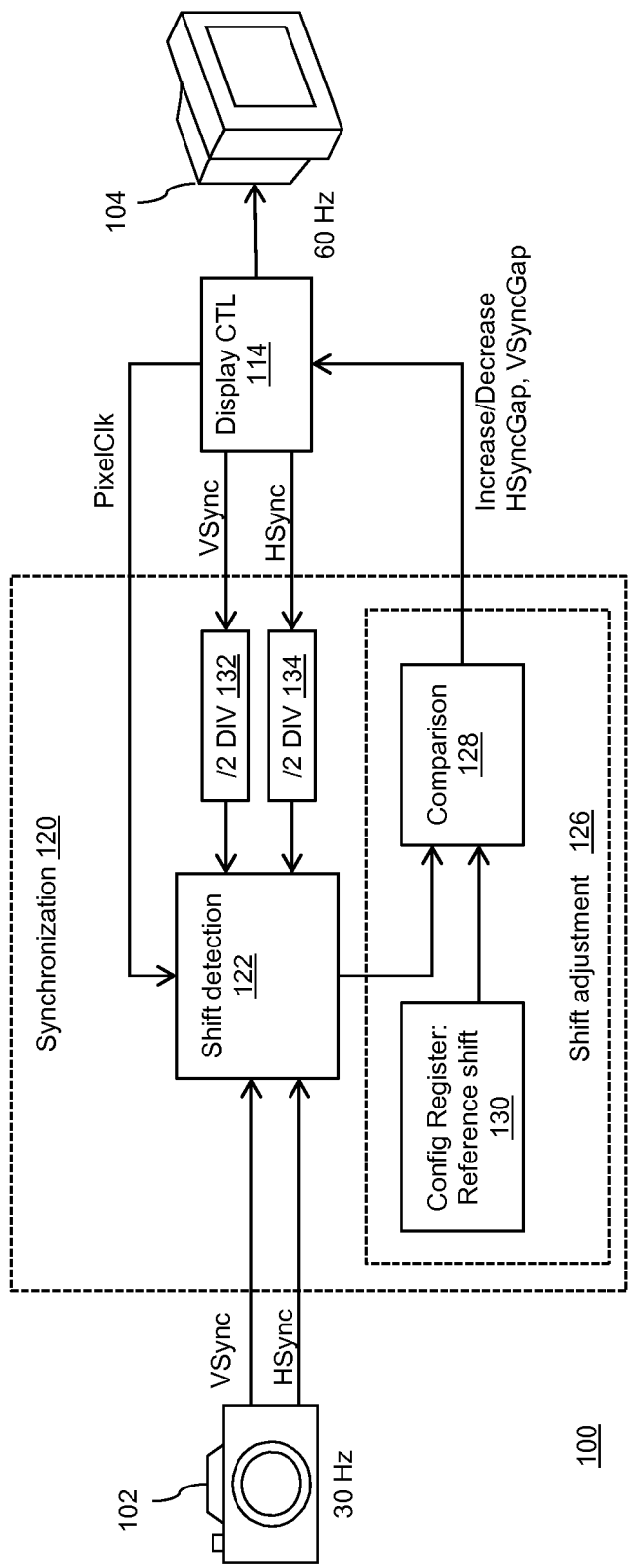
FIG. 5 schematically illustrates an example of an embodiment of a synchronization unit in the video buffering and frame rate doubling device of FIG. 4.

FIG. 5 schematically shows an example in which the shift adjustment unit 126 includes a comparison unit 128 and a configuration register 130. The comparison unit 128 has a first input connected to the shift detection unit 122 and a second input connected to the configuration register. The comparison unit 128 further has an output connected to the display control unit 114. In operation, the comparison unit 128 compares a phase shift detected by the shift detection unit 122 against a reference phase shift stored in the configuration register 130 and generates a control signal in dependence on the difference between the detected phase shift and the reference phase shift. The control signal can be fed to the display control unit 114 to adjust an hsync gap or a vsync gap, or both, of the display control unit 114 in order to reduce the difference between the detected phase shift and the reference phase shift.

In the example, the synchronization unit 120 includes a first frequency divider 132 connected between a vsync output of the display controller 114 and the shift detection unit 122. The synchronization unit 120 further includes a second frequency divider 134 connected between an hsync output of the display control unit 114 and the shift detection unit 122. Each of first and second frequency dividers has a frequency division ratio of 1/2 to produce a respective output signal having a frequency that is half of a frequency of the respective input signal. In operation, the frequency dividers 132 and 134 effectively suppress every second vsync symbol and every second hsync symbol from the display control unit 114. The frequency dividers 132 and 134 thus provide the shift detection unit 122 with a frequency-divided vsync signal and a frequency-divided hsync signal that are locked in phase, respectively, to the original vsync signal and the original hsync signal from the display controller 114. The shift detection unit 122 further determines vsync shift (i.e. a phase shift between the vsync signal from the video source 102 and the frequency-divided vsync symbol from the frequency divider 132) and an hsync shift (i.e. a phase shift between the vsync signal from the video source 102 and the frequency-divided vsync symbol from the frequency divider 132) and determines a phase shift on the basis of both the vsync shift and the hsync shift and provides the thus determined phase shift to the comparison unit 128.

Figure 6:
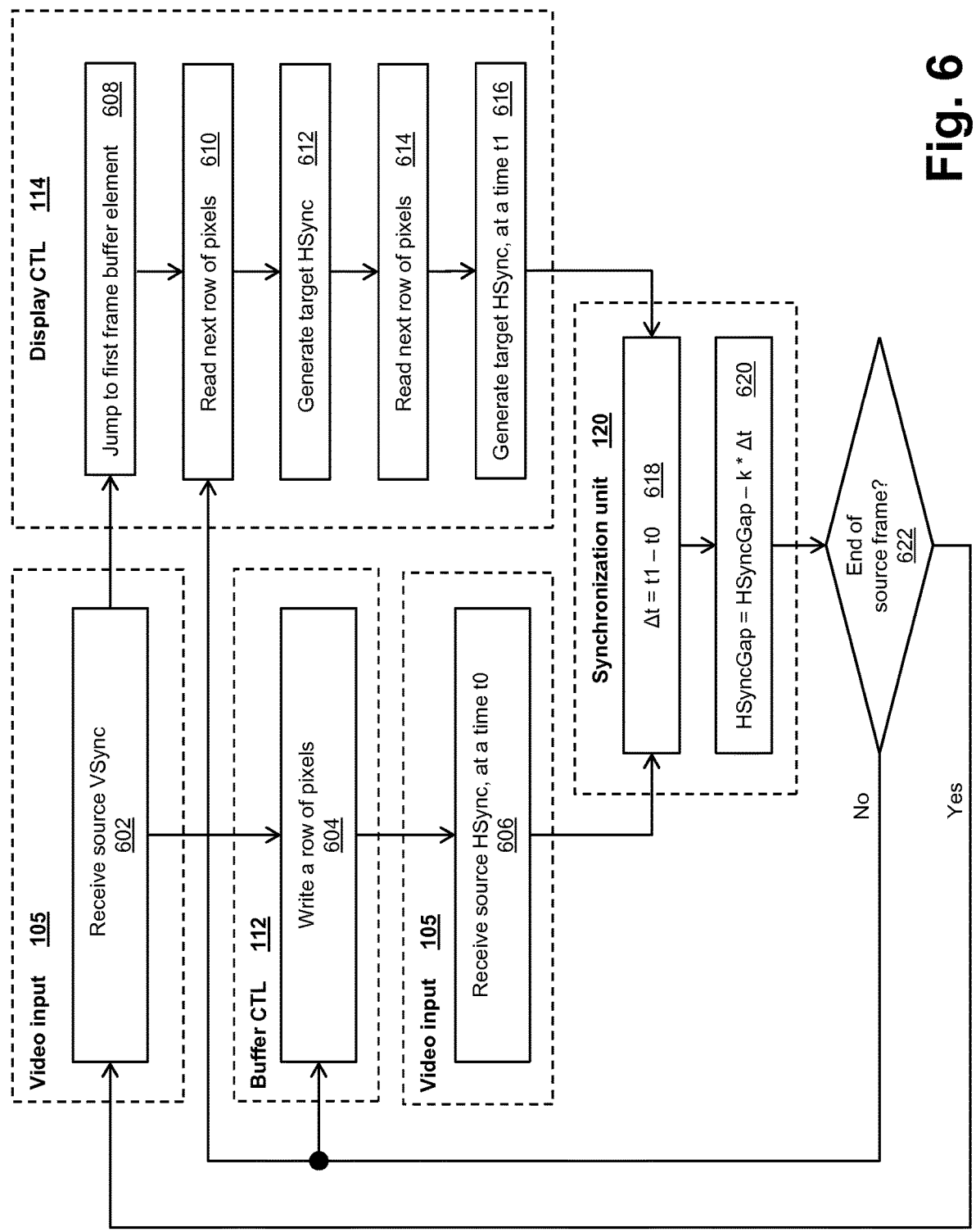
FIG. 6 shows a flow chart of an example of an embodiment of a method of buffering a video stream.

The flow chart in FIG. 6 schematically represents an example of a method of buffering a video stream. In the example, the method is carried out using the buffering unit 106 described above. Operations 602, 604, and 606 can be carried out by the buffer control unit 112. Operations 608 to 616 can be carried out by the display control unit 114. Operations 618 and 620 can be carried out by the synchronization unit 120. Operation 622 represents a logical step that may be provided jointly by, e.g., the buffer control unit 112 and the display control unit 114. In the example, the video input 105 receives a vsync symbol (source vsync symbol) from the video source (602). The display control unit 114, in response to the reception of the source vsync symbol, sets its read pointer to the first element of the frame buffer 110, i.e. to the start of frame stored in the frame buffer 110 (608), reads a row of pixels from a frame buffer element (610), generates a target hsync symbol (612), reads the content of a next row of pixels from a frame buffer element (614), and, at a time t1, generates another target hsync symbol (616). In the meantime, the buffer control unit 112 writes a row of pixels to the frame buffer (604). The video input 105 then receives an hsync symbol from, e.g., the video source 102, at a time t0 (606). Ideally, the times t0 and t1 are identical. In other words, the display control unit 114 should generate the target hsync symbol (in operation 616) when the video input 105 receives the source hsync symbol (in operation 606). The synchronization unit 120 then determines the time difference t1−t0 (618), i.e., a current hsync delay. The synchronization unit 120 then further updates the value of an hsync gap on the basis of the hsync delay (620). For instance, the new value of the hsync gap can be computed as the current value of the hsync gap minus k times ΔT wherein ΔT=t1−t0 is the hsync delay. It can then be determined whether the end of the respective source frame has been reached (622). If the end of the source frame has been reached, the method may continue with the reception of the next vsync symbol from the video source (602). If, however, the end has not been reached, i.e. when one or more pixel rows of the current frame still need to be written to the frame buffer, the method can continue with operations 604 and 610. That is, the buffer control unit 112 then writes a next row of pixels to the frame buffer (604) while the display control unit 114 reads a next row of pixels, generates a next hsync symbol in the target video stream, and reads a further row of pixels (610, 612, 614). In this example, vsync symbols from the video source 102 are thus used as triggers to force exact synchronization at the beginning of a new write cycle, while hsync symbols from the video source 102 are used to control the hsync gap of the display control unit 114 to maintain sufficiently accurate synchronization during the respective write cycle.

Figure 7:
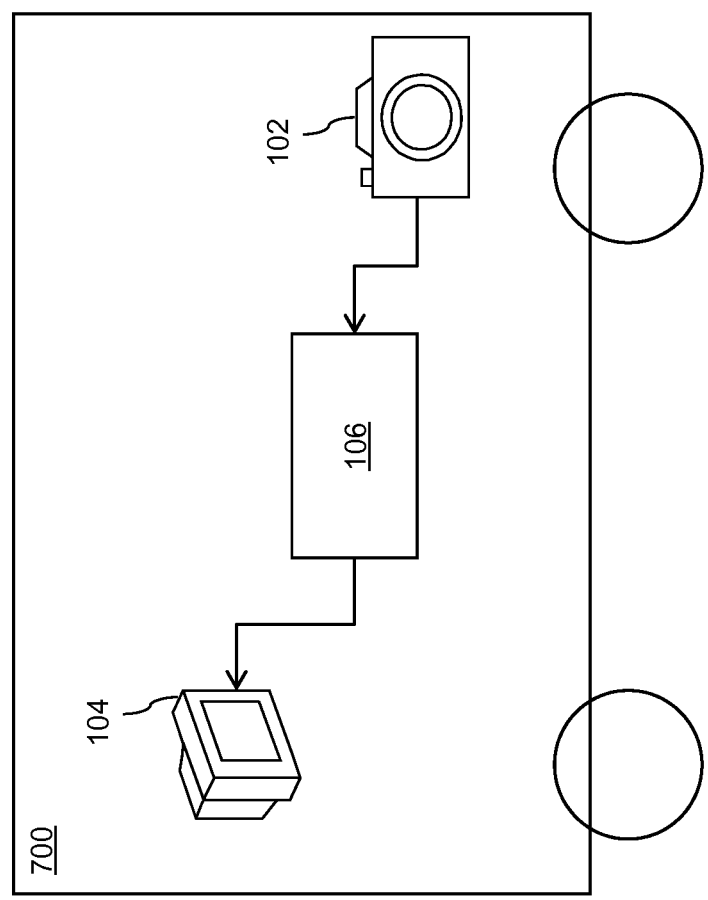
FIG. 7 schematically shows an example of an embodiment of a vehicle including a video system.

FIG. 7 schematically shows an example of a video system mounted in or on a vehicle 700, e.g., a motor car. The video system includes a video camera providing a video source 102. The video camera may, for instance, be mounted near a rear section of the vehicle and be oriented to provide a backward view. The video display 104 can be mounted so as to be visible for a driver (not shown) of the vehicle. The driver can thus be provided with a live view of a backward scene of the vehicle 700, e.g., for facilitating manoeuvring the vehicle in a constrained environment, e.g., when parking the vehicle.

The invention can also be implemented in a computer program for running on a computer system, at least including code portions for performing steps of a method according to the invention when run on a programmable apparatus, such as a computer system or enabling a programmable apparatus to perform functions of a device or system according to the invention. A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, a plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the buffer control unit 112 and the display control unit 114 may be integrated in a memory control unit (MCU).

Also for example, in one embodiment, the illustrated examples may be implemented as circuitry located on a single integrated circuit or within a same device. For example, the buffering unit 106 may be implemented in a single integrated circuit. Alternatively, the examples may be implemented as any number of separate integrated circuits or separate devices interconnected with each other in a suitable manner. For example, the memory unit 108, the buffer control unit 112, and the display control unit 114 may be located on interconnected separate devices.

Also for example, the examples, or portions thereof, may be implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprise' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A video buffering and frame rate doubling device, comprising:
    a video input configured to receive a source video stream, wherein the source video stream has a source frame rate;
    a memory unit, coupled to the video input, and arranged to provide a single frame buffer having a size of one video frame of the source video stream;
    a buffer control unit, coupled to the memory unit, and arranged to write a sequence of image data units of the source video stream consecutively to the frame buffer at the source frame rate in accordance with a circular buffering scheme; and
    a display control unit, coupled to the memory unit, and arranged to read the image data units from the frame buffer in accordance with the circular buffering scheme with a frame rate that is twice the source frame rate so as to generate a target video stream having a frame rate which is twice the source frame rate.

2. The video buffering and frame rate doubling device of claim 1, comprising a video output connected or connectable to a video display so as to provide the target video stream to the video display.

3. The video buffering and frame rate doubling device of claim 1, comprising a synchronization unit having an input connected to the video input and an output connected to the display control unit, wherein the synchronization unit is arranged to adapt a timing of read accesses to the frame buffer by the display control unit to the timing of the source video stream so as to translate each video frame of the source video stream into a pair of identical or nearly identical successive video frames of the target video stream.

4. The video buffering and frame rate doubling device of claim 1, wherein the display control unit is arranged to generate a sequence of vsync symbols and vsync gaps and a sequence of hsync symbols and hsync gaps associated with the target video stream, wherein each vsync symbol is followed by a vsync gap and each hsync symbol is followed by an hsync gap.

5. The video buffering and frame rate doubling device of claim 4, comprising a synchronization unit connected to the video input and to the display control unit and arranged to adjust the lengths of the vsync gaps or the lengths of the hsync gaps of the target video stream, or both, on the basis of the source video stream so as to adapt a timing of read accesses to the frame buffer by the display control unit to the timing of the source video stream.

6. The video buffering and frame rate doubling device of claim 5, wherein the synchronization unit is arranged to adjust the lengths of the vsync gaps or the lengths of the hsync gaps, or both, of the target video stream so as to translate each video frame of the source video stream into a double frame.

7. The video buffering and frame rate doubling device of claim 5, wherein the synchronization unit comprises a feedback loop arranged to determine a vsync delay, which is a delay between a vsync symbol of the source video stream and a vsync symbol of the target video stream, and to adjust the lengths of the vsync gaps or the lengths of the hsync gaps of the target video stream, or both, on the basis of the vsync delay.

8. The video buffering and frame rate doubling device of claim 7, wherein the feedback loop is further arranged to determine an hsync delay, which is a delay between an hsync symbol of the source video stream and an hsync symbol of the target video stream, and to adjust the lengths of the vsync gaps or the lengths of the hsync gaps of the target video stream, or both, on the basis of both the vsync delay and the hsync delay.

9. The video buffering and frame rate doubling device of claim 3, wherein the synchronization unit is arranged to detect vsync symbols of the source video stream and wherein the display control unit is arranged to start a new read-out cycle in response to detection of a vsync symbol of the source video stream.

10. The video buffering and frame rate doubling device of claim 9, wherein the display control unit is arranged to perform two successive read-out cycles in response to detection of a vsync symbol in the source video stream by the synchronization unit, the two successive read-out cycles comprising a first read-out cycle followed by a second read-out cycle, wherein the first read-out cycle comprises re-reading a video frame from the frame buffer that was read in the preceding read-out cycle, and wherein the second read-out cycle comprises reading a new video frame from the frame buffer.

11. The video buffering and frame rate doubling device of claim 3, wherein the synchronization unit comprises a shift detection unit having a vsync input connected to a vsync output of the display control unit and an hsync input connected to an hsync output of the display control unit.

12. The video buffering and frame rate doubling device of claim 11, wherein the synchronization unit comprises a frequency divider connected between the vsync output of the display control unit and the vsync input of the shift detection unit.

13. The video buffering and frame rate doubling device of claim 11, wherein the synchronization unit comprises a frequency divider connected between the hsync output of the display control unit and the hsync input of the shift detection unit.

14. The video buffering and frame rate doubling device of claim 1, coupled to a video source to receive the source video stream from the video source, wherein the video source is connected or connectable to a first clock so as to be clocked by the first clock and wherein the display control unit is connected or connectable to a second clock so as to be clocked by the second clock, wherein the first clock and the second clock are operable independently.

15. The video buffering and frame rate doubling device of claim 1, wherein the frame rate of the source video stream is 30 Hz and the frame rate of the target video stream is 60 Hz.

16. The video buffering and frame rate doubling device of claim 1, coupled to a video source to receive the source video stream from the video source, wherein the video source is a camera.

17. A vehicle comprising:
a video buffering and frame rate doubling device including:
a video input configured to receive a source video stream, wherein the source video stream has a source frame rate,
a memory unit, coupled to the video input, and arranged to provide a single frame buffer having a size of one video frame of the source video stream,
a buffer control unit, coupled to the memory unit, and arranged to write a sequence of image data units of the source video stream consecutively to the frame buffer at the source frame rate in accordance with a circular buffering scheme, and
a display control unit, coupled to the memory unit, and arranged to read the image data units from the frame buffer in accordance with the circular buffering scheme with a frame rate that is twice the source frame rate so as to generate a target video stream having a frame rate which is twice the source frame rate; and
a video source, wherein the video buffering and frame rate doubling device is coupled to the video source to receive the source video stream from the video source, wherein the video source is a camera, and wherein the camera is mounted in or on the vehicle.

18. The vehicle of claim 17, wherein the camera is mounted near a rear section of the vehicle and oriented to provide a backward view.

19. A method of buffering a video stream, wherein the method comprises:
receiving a source video stream, the source video stream having a source frame rate;
writing image data units of the source video stream consecutively to a single frame buffer at the source frame rate in accordance with a circular buffering scheme and in real-time response to the source video stream, wherein the frame buffer has a size of one video frame of the source video stream;
reading image data units from the frame buffer in accordance with the circular buffering scheme with a frame rate that is twice the source frame rate so as to generate a target video stream having a frame rate which is twice the source frame rate.

20. The method of claim 19, comprising adapting a timing of read accesses to the frame buffer by the display control unit to the timing of the source video stream so as to translate each video frame of the source video stream into a pair of identical or nearly identical successive video frames of the target video stream.

* * * * *